UNITED STATES PATENT OFFICE.

ABRAM S. HUMPHREY, OF POUGHKEEPSIE, NEW YORK.

IMPROVEMENT IN STAINING COMPOUNDS FOR LEATHER, PAPER, &c.

Specification forming part of Letters Patent No. 179,560, dated July 4, 1876; application filed December 28, 1875.

*To all whom it may concern:*

Be it known that I, ABRAM S. HUMPHREY, of Poughkeepsie, in the county of Dutchess and State of New York, have invented a new and Improved Staining Compound for Leather, Paper, and other Materials, which invention is fully set forth in the following specification.

This invention relates to a compound made of aniline-red, aniline-blue, and aniline-brown, mixed with alcohol, sulphate of iron, or muriated tincture of iron, water, oil, and amber, which, when applied to leather, paper, or other suitable material, penetrates the fibers thereof, and imparts to the same an intense and durable black color.

In preparing my compound I take aniline color one and one-half part; alcohol, one hundred and twelve parts; sulphate of iron, or muriated tincture of iron, sixteen parts; oil, eight parts; oil of amber and water to suit, usually about two parts of the former and eight parts of the latter.

The aniline colors which I employ, by preference, are red aniline, blue aniline, and brown aniline, and I generally take equal quantities of these colors in preparing my compound. My compound may, however, be made with either of the aniline colors alone without deviating from my invention.

The aniline color is dissolved in the alcohol, and by the addition of oil and sulphate of iron a compound is obtained which will readily combine with the fibers of leather, paper, or other similar material, the oil serving to penetrate the said material, and to open its fibers, while the sulphate of iron, or muriated tincture of iron, acts as a mordaunt, whereby the color is firmly bound to the fibers.

In order to reduce the expense of my compound I add to it a quantity of water, and I also add amber for the purpose of disguising the smell of the alcohol.

The color produced by my compound on leather, paper, or other similar material is a jet-black; but, by changing the proportions of the aniline colors, different shades may be produced.

What I claim as new, and desire to secure by Letters Patent, is—

A staining compound for leather, paper, and other similar materials, made of aniline color, alcohol, sulphate of iron, or muriated tincture of iron, and oil, with or without water, and amber, substantially in the manner herein set forth.

In testimony that I claim the foregoing I have hereunto set my hand and seal this 7th day of December, 1875.

ABRAM S. HUMPHREY. [L. S.]

Witnesses:
JOHN V. HUMPHREY,
ALBERT CLARK.